US012753822B2

(12) United States Patent
Jeong et al.

(10) Patent No.: US 12,753,822 B2
(45) Date of Patent: Oct. 6, 2026

(54) DAMPING APPARATUS AND GRINDER INCLUDING THE SAME

(71) Applicant: SAMSUNG ELECTRONICS CO., LTD., Suwon-si (KR)

(72) Inventors: Jaeil Jeong, Suwon-si (KR); Yeoiwon Seo, Suwon-si (KR); Seonggi Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 18/651,268

(22) Filed: Apr. 30, 2024

(65) Prior Publication Data

US 2025/0146553 A1 May 8, 2025

(30) Foreign Application Priority Data

Nov. 7, 2023 (KR) ........................ 10-2023-0152674

(51) Int. Cl.
*F16F 15/02* (2006.01)
*B24B 41/00* (2006.01)

(52) U.S. Cl.
CPC .......... *F16F 15/022* (2013.01); *B24B 41/007* (2013.01); *F16F 2232/06* (2013.01); *F16F 2238/026* (2013.01)

(58) Field of Classification Search
CPC ........ F16F 7/10; F16D 7/104; B23Q 11/0032; B23Q 11/0025
See application file for complete search history.

(56) References Cited

U.S. PATENT DOCUMENTS

| | | | | |
|---|---|---|---|---|
| 5,558,191 A | | 9/1996 | Lai | |
| 5,564,536 A | | 10/1996 | Lai | |
| 5,915,508 A | | 6/1999 | Lai | |
| 2016/0069409 A1* | | 3/2016 | McGranahan .......... | F16F 7/104 188/380 |
| 2020/0217386 A1* | | 7/2020 | Kordunsky .......... | G05B 19/042 |

(Continued)

FOREIGN PATENT DOCUMENTS

| | | | |
|---|---|---|---|
| CN | 113714927 A * | 11/2021 | ........... B24B 41/007 |
| EP | 756673 | 2/1999 | |
| JP | 2007183356 | 7/2007 | |

(Continued)

OTHER PUBLICATIONS

CN113714927A Machine Translation (No Date).*

*Primary Examiner* — Robert A. Siconolfi
*Assistant Examiner* — Shea Woodrow Irvin
(74) *Attorney, Agent, or Firm* — Fish & Richardson P.C.

(57) ABSTRACT

A damping apparatus may include a plurality of weights, a plurality of dampers, a plurality of springs and a plurality of pressurizing modules. The plurality of the weights may be connected to a spindle. The plurality of the dampers may be arranged between adjacent lower weights among the plurality of the weights to attenuate a vibration of the spindle. The plurality of the springs may be arranged between adjacent upper weights among the plurality of the weights. The plurality of the pressurizing modules may be configured to selectively connect each of the springs with adjacent upper weights. Thus, a natural frequency of the damping apparatus may be controlled to effectively attenuate the vibration of the spindle.

20 Claims, 8 Drawing Sheets

(56) References Cited

U.S. PATENT DOCUMENTS

2022/0134501 A1 * 5/2022 Ahn ........................ F16F 15/04
409/141

FOREIGN PATENT DOCUMENTS

| | | |
|---|---|---|
| JP | 2009174120 | 8/2009 |
| JP | 6999451 | 1/2022 |
| KR | 1266831 | 5/2013 |
| KR | 2145697 | 8/2020 |

* cited by examiner

DAMPING APPARATUS AND GRINDER INCLUDING THE SAME

CROSS-RELATED APPLICATION

This application claims priority under 35 USC § 119 to Korean Patent Application No. 10-2023-0152674, filed on Nov. 7, 2023 in the Korean Intellectual Property Office (KIPO), the contents of which are herein incorporated by reference in their entirety.

BACKGROUND

Generally, in order to reduce a thickness of a wafer, a backside of the wafer may be removed using a grinder. The grinder may include a grinding wheel configured to make contact with the backside of the wafer, a spindle configured to provide the grinding wheel with a rotary force, etc.

The grinding wheel may remove the backside of the wafer by a desired thickness by a vertical movement of the spindle. However, a vibration of the spindle may act as an uncontrollable factor with respect to the vertical movement of the spindle. Particularly, the vibration of the spindle may weaken a cohesive strength of the wafer.

SUMMARY

Example implementations relate to a damping apparatus and a grinder including the same. More particularly, example implementations relate to a damping apparatus configured to attenuate a spindle used for grinding a backside of a wafer and a grinder including the damping apparatus.

Example implementations provide a damping apparatus that may be capable of effectively attenuating a vibration of a spindle.

Example implementations also provide a grinder including the above-mentioned damping apparatus.

According to example implementations, there may be provided a damping apparatus. The damping apparatus may include a plurality of weights, a plurality of dampers, a plurality of springs and a plurality of pressurizing modules. The plurality of the weights may be connected to a spindle. The plurality of the dampers may be arranged between adjacent lower weights among the plurality of the weights to attenuate a vibration of the spindle. The plurality of the springs may be arranged between adjacent upper weights among the plurality of the weights. The plurality of the pressurizing modules may be configured to selectively connect each of the springs with any one of the adjacent upper weights.

According to example implementations, there may be provided a damping apparatus. The damping apparatus may include a plurality of weights, a plurality of dampers, a plurality of springs and a plurality of pressurizing modules. The plurality of the weights may be vertically stacked on an upper surface of a spindle. The plurality of the dampers may be connected between a lowermost weight and a weight just over the lowermost weight among the plurality of the weights. The plurality of the springs may be arranged between an uppermost weight and a weight just under the uppermost weight among the plurality of the weights. The plurality of the pressurizing modules may selectively connect lower ends of the springs with the weight just under the uppermost weight.

According to example implementations, there may be provided a grinder. The grinder may include a grinding wheel, a spindle and a damping apparatus. The grinding wheel may be configured to grind a backside of a wafer. The spindle may be configured to provide the grinding wheel with a rotary force. The damping apparatus may be configured to attenuate a vibration of the spindle. The damping apparatus may include a plurality of weights, a plurality of dampers, a plurality of springs and a plurality of pressurizing modules. The plurality of the weights may be connected to a spindle. The plurality of the dampers may be arranged between adjacent lower weights among the plurality of the weights to attenuate a vibration of the spindle. The plurality of the springs may be arranged between adjacent upper weights among the plurality of the weights. The plurality of the pressurizing modules may be configured to selectively connect each of the springs with any one of the adjacent upper weights.

According to example implementations, the pressurizing modules may selectively connect the springs with the weights to control a total spring constant of the springs. Thus, a natural frequency of the damping apparatus may be controlled to effectively attenuate the vibration of the spindle.

BRIEF DESCRIPTION OF THE DRAWINGS

Example implementations will be more clearly understood from the following detailed description taken in conjunction with the accompanying drawings.

FIG. 1 is a cross-sectional view illustrating an example grinder;

FIG. 2 is a perspective view illustrating a damping apparatus of the grinder in FIG. 1;

FIG. 3 is a side view illustrating a spring of the damping apparatus in FIG. 2;

FIG. 4 is a plan view illustrating a weight of the damping apparatus in FIG. 2;

FIG. 5 is a side view illustrating an example spring of a damping apparatus;

FIG. 6 is a plan view illustrating a weight of the damping apparatus in FIG. 5;

FIGS. 7 and 8 are cross-sectional views illustrating a pressurizing module provided to a damping apparatus of the grinder in FIG. 1;

FIGS. 9 and 10 are cross-sectional views illustrating an example pressurizing module of a damping apparatus;

FIGS. 11 and 12 are cross-sectional views illustrating a pressurizing module of a damping apparatus in accordance with example embodiments; and FIGS. 13 and 14 are cross-sectional views illustrating an example pressurizing module of a damping apparatus.

DETAILED DESCRIPTION

Hereinafter, example implementations will be explained in detail with reference to the accompanying drawings.

Figure 1:
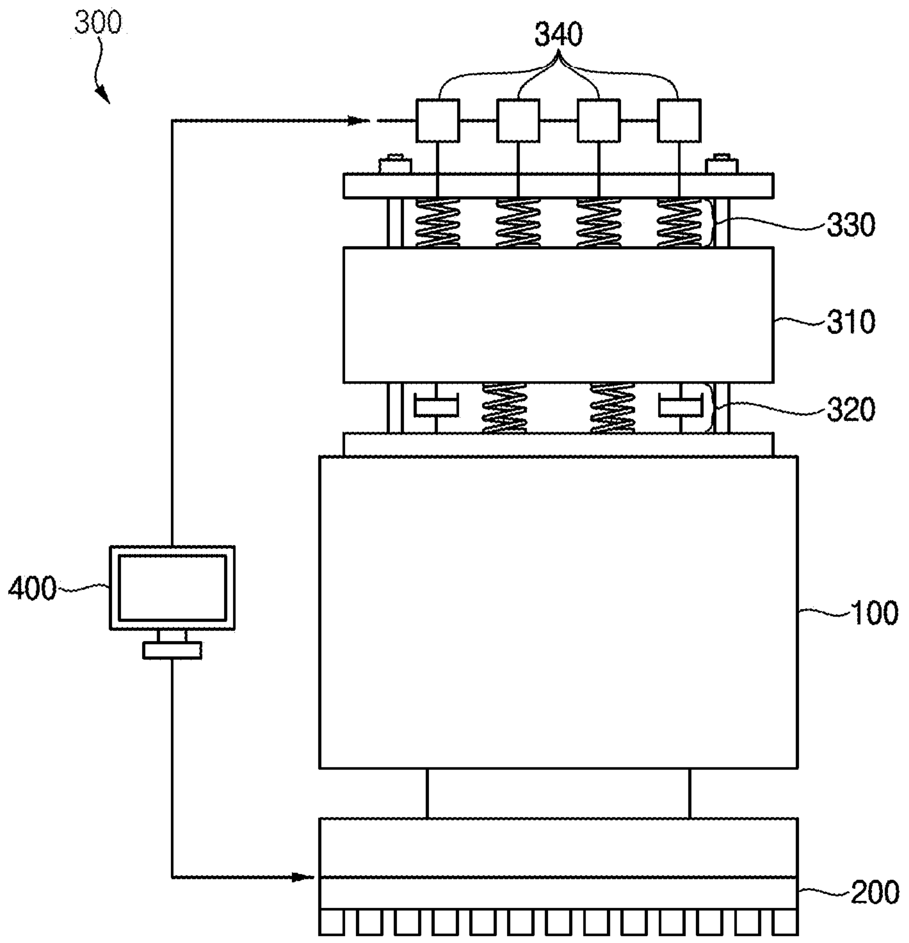
FIGS. 1 to 14 represent non-limiting, example implementations as described herein.
Figure 2:
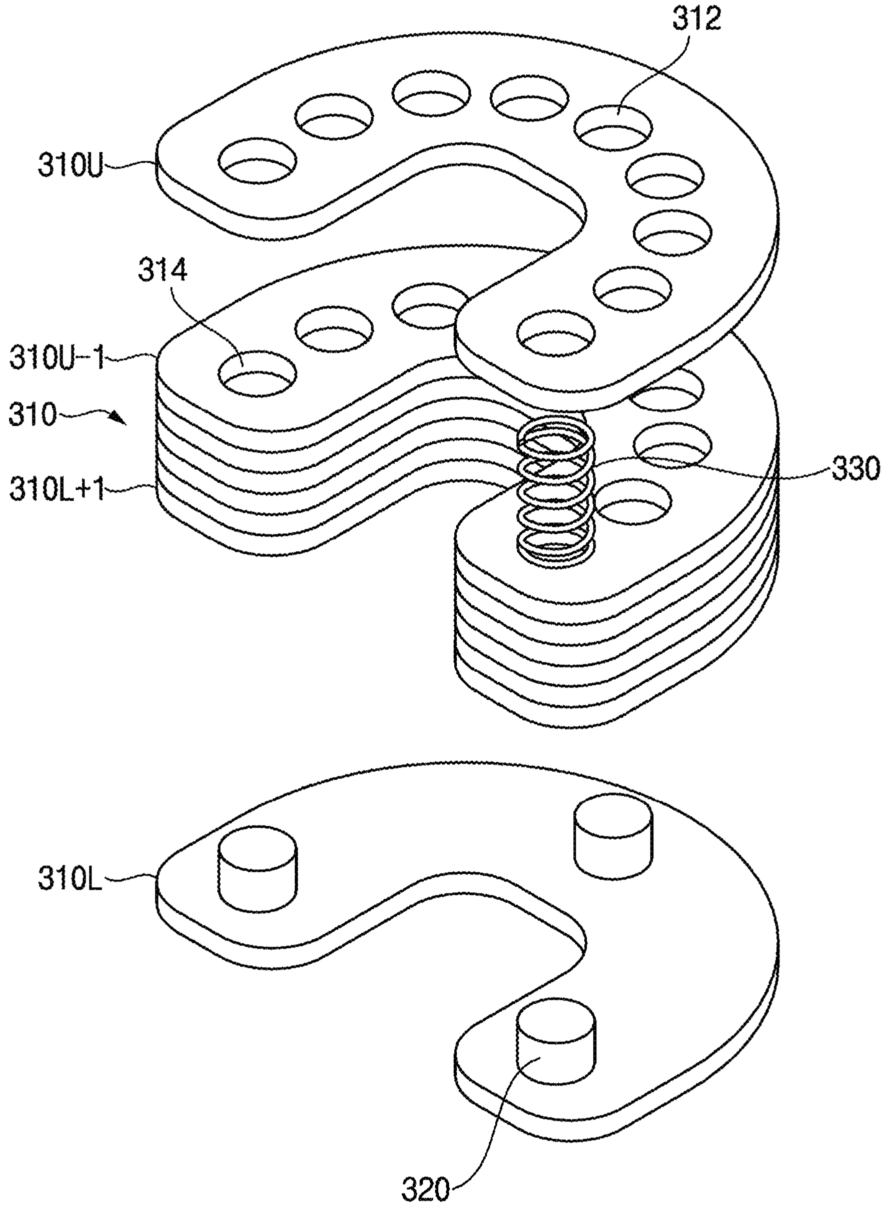
Figure 3:
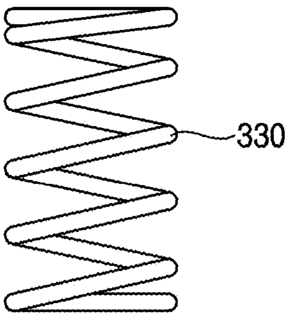
Figure 4:
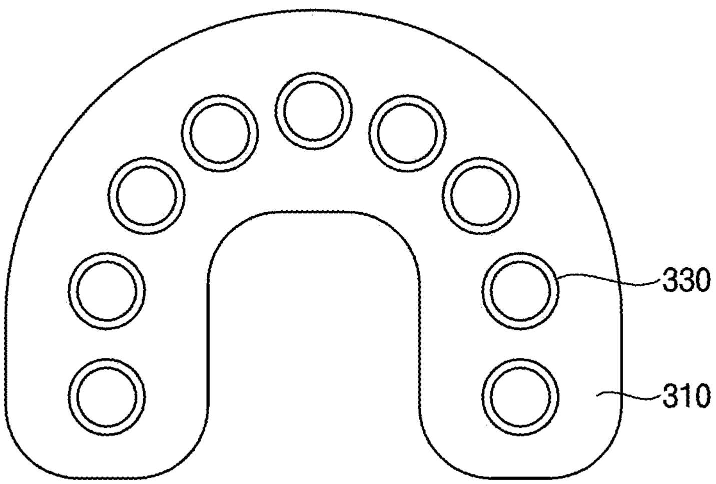

FIG. 1 is a cross-sectional view illustrating an example grinder. FIG. 2 is a perspective view illustrating a damping apparatus of the grinder in FIG. 1. FIG. 3 is a side view illustrating a spring of the damping apparatus in FIG. 2. FIG. 4 is a plan view illustrating a weight of the damping apparatus in FIG. 2.

A damping apparatus 300 may be, for example applied to a grinder configured to grind a backside of a wafer but is not limited thereto. For example, the damping apparatus 300 may be applied to various apparatuses requiring a structure for attenuating a vibration of a spindle, particularly, a rotary component of the spindle.

Referring to FIGS. 1 to 4, the grinder of the examples may include a grinding wheel 200, a spindle 100, the damping apparatus 300 and a controller 400.

The grinding wheel 200 may make rotary contact with the backside of the wafer to grind the backside of the wafer. The spindle 100 may be arranged over the grinding wheel 200 to provide the grinding wheel 200 with a rotary force. The damping apparatus 300 may be arranged over the spindle 100 to attenuate the vibration of the spindle 100, particularly, the rotary component of the spindle 100. The controller 400 may control an operation of the damping apparatus 300. Further, the controller 400 may control an operation of the spindle 100.

The damping apparatus 300 may include a plurality of weights 310, a plurality of dampers 320, a plurality of springs 330 and a plurality of pressuring modules 340.

The weights 310 may be connected to an upper surface of the spindle 100. Particularly, the weights 310 may be vertically stacked on the upper surface of the spindle 100. In example implementations, each of the weights 310 may have a horseshoe shape, but the shape is not limited thereto.

In example implementations, the weights 310 may include a lowermost weight 310L, a lower weight 310L+1 arranged just over the lowermost weight 310L, an uppermost weight 310U, an upper weight 310U−1 arranged just under the uppermost weight 310U−1 and at least one middle weight arranged between the lower weight 310L+1 and the upper weight 310U−1. The lowermost weight 310L may be connected to the upper surface of the spindle 100. Alternatively, the weights 310 may not include the middle weight.

The uppermost weight 310U may include a plurality of upper spring holes 312. The upper spring holes 312 may be vertically formed through the uppermost weight 310U. That is, an upper end of each of the upper spring holes 312 may be exposed through an upper surface of the uppermost weight 310U. A lower end of each of the upper spring holes 312 may be exposed through a lower surface of the uppermost weight 310U. In example implementations, the upper spring holes 312 may all have substantially the same size, but the size is not limited thereto. Further, the upper spring holes 312 may be spaced apart from each other by a uniform gap but are not limited thereto.

The upper weight 310U−1 may include a plurality of lower spring holes 314. The lower spring holes 314 may be vertically extended from an upper surface of the upper weight 310U−1. However, a depth of the lower spring holes 314 may be less than a thickness of the upper weight 310U−1. Thus, a lower end of each of the lower spring holes 314 may not be exposed through a lower surface of the upper weight 310U−1. In example implementations, an arrangement of the lower spring holes 314 may be substantially the same as an arrangement of the upper spring holes 312. The lower spring holes 314 may have substantially the same size but are not limited thereto. Further, a size of each of the lower spring holes 314 may be substantially the same as the size of each of the upper spring holes 312.

The dampers 320 may be arranged between the lowermost weight 310L and the lower weight 310L+1. The damper 320 may attenuate the vibration of the spindle 100 applied to the lowermost weight 310L. The dampers 320 may have various structures configured to reduce the vibration of the spindle 100.

The springs 330 may be arranged between the uppermost weight 310U and the upper weight 310U−1. Particularly, an upper end of each of the springs 330 may be movably inserted into the upper spring hole 312. A lower end of each of the springs 330 may be selectively inserted into the lower spring hole 314. A total spring constant of the springs 330 may be controlled by selectively inserting the lower ends of the springs 330 into the lower spring holes 314. That is, only the spring 330 inserted into the lower spring hole 314 may act as an effective spring contributing to the total spring constant.

The pressuring modules 340 may be configured to selectively connect each of the springs 330 with any one of the adjacent weights 310. That is, the pressuring modules 340 may downwardly pressurize selectively the upper ends of the springs 330 so that the lower ends of the springs 330 may be selectively inserted into the lower spring holes 314.

Figure 7:
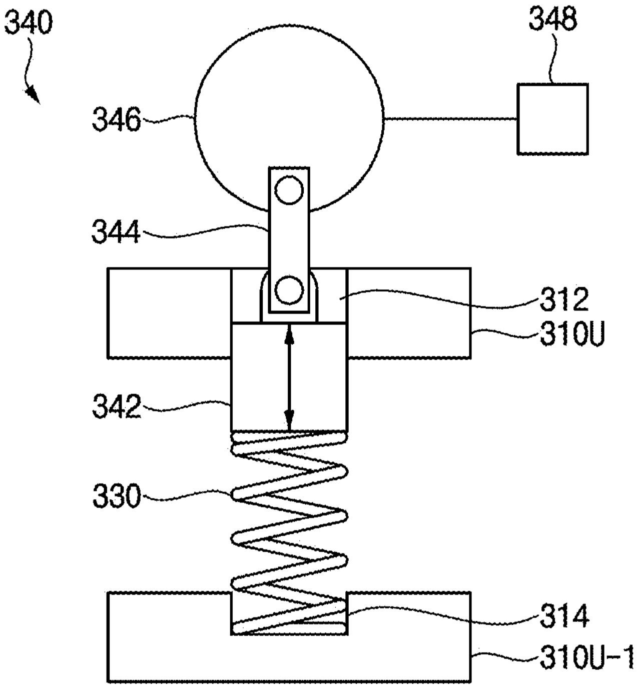
Figure 8:
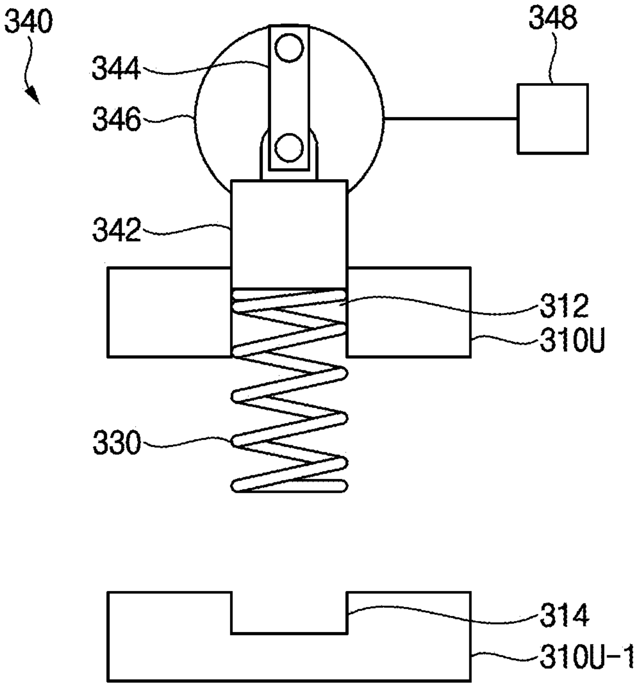

FIGS. 7 and 8 are cross-sectional views illustrating a pressurizing module provided to a damping apparatus of the grinder in FIG. 1.

Referring to FIGS. 7 and 8, each of the pressuring modules 340 may include a piston 342, a connecting rod 344, a crankshaft 346 and an actuator 348. The piston 342 may be movably received in the upper spring hole 312. The piston 342 may be connected to the upper end of the spring 330. A lower end of the connecting rod 344 may be rotatably connected to the piston 342. An upper end of the connecting rod 344 may be rotatably connected to the crankshaft 346. The crankshaft 346 may be rotated with respect to a horizontal direction. The actuator 348 may provide the crankshaft 346 with a rotary force with respect to the horizontal direction.

Therefore, the connecting rod 344 may be upwardly or downwardly moved by rotating the crankshaft 346 with respect to the horizontal direction. As a result, the piston 342 may be upwardly or downwardly moved together with the connecting rod 344 so that the lower end of the spring 330 may be selectively inserted into the lower spring hole 314.

Figure 5:
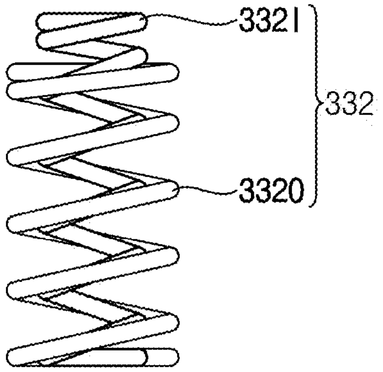
Figure 6:
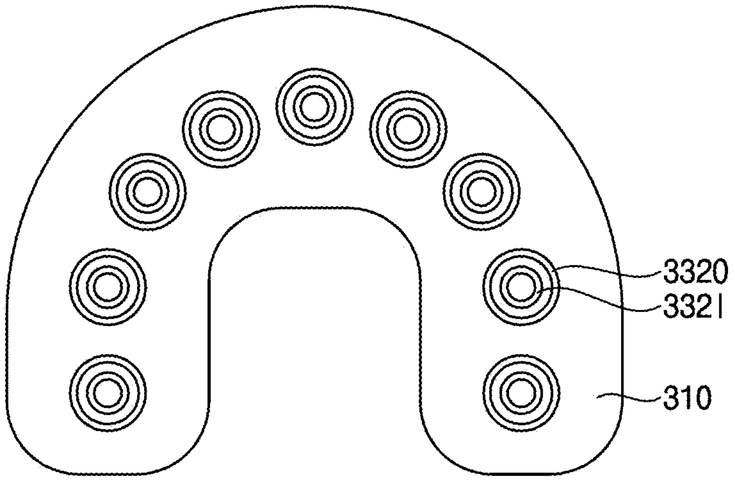

FIG. 5 is a side view illustrating a spring of a damping apparatus in accordance with example implementations and FIG. 6 is a plan view illustrating a weight of the damping apparatus in FIG. 5.

Referring to FIGS. 5 and 6, an example spring 332 may include an outer spring 3320 and an inner spring 3321. The inner spring 3321 may be arranged inside a coil of the outer spring 3320.

Figure 9:
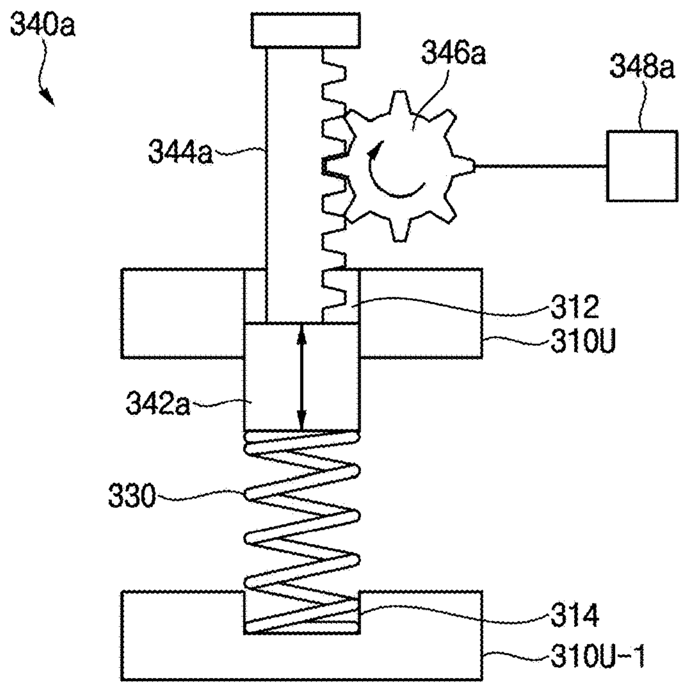
Figure 10:
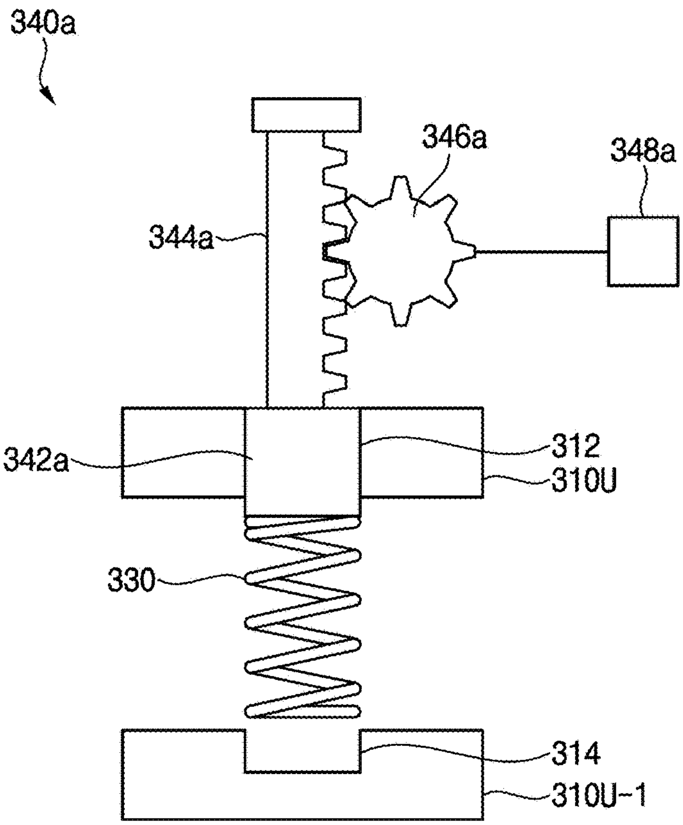

FIGS. 9 and 10 are cross-sectional views illustrating an example pressurizing module of a damping apparatus.

Referring to FIGS. 9 and 10, an example pressuring module 340*a* may include a piston 342*a*, a rack 344*a*, a pinion 346*a* and an actuator 348*a*. The piston 342*a* may be movably received in the upper spring hole 312. The piston 342*a* may be connected to the upper end of the spring 330. The rack 344*a* may be connected to the piston 342*a*. The pinion 346*a* may be engaged with the rack 344*a*. The actuator 348*a* may provide the pinion 346*a* with a rotary force with respect to the horizontal direction.

Therefore, the rack 344*a* may be upwardly or downwardly moved by rotating the pinion 346*a* with respect to the horizontal direction. As a result, the piston 342*a* may be upwardly or downwardly moved together with the rack 344*a* so that the lower end of the spring 330 may be selectively inserted into the lower spring hole 314.

Figure 11:
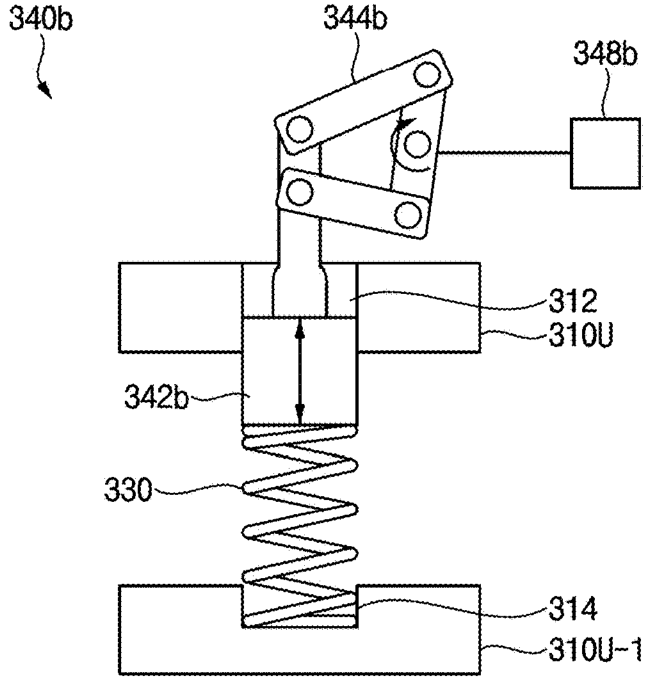
Figure 12:
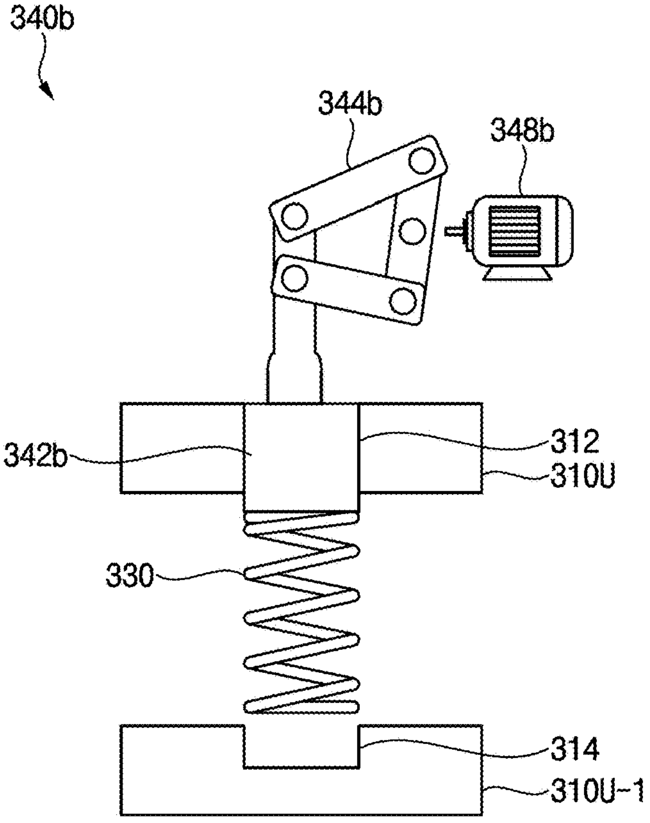

FIGS. 11 and 12 are cross-sectional views illustrating an example pressurizing module of a damping apparatus.

Referring to FIGS. 11 and 12, an example pressuring module 340*b* may include a piston 342*b*, an articulated link 344*b* and an actuator 348*a*. The piston 342*b* may be movably received in the upper spring hole 312. The piston 342*b* may be connected to the upper end of the spring 330. The articulated link 344*b* may be connected to the piston 342*b*. The articulated link 344*b* may include a plurality of links connected with each other via hinges. In examples, the articulated link 344*b* may include the four links shown but is not limited thereto. The actuator 348*a* may open or close the articulated link 344*b*.

Therefore, the piston 342*b* may be upwardly or downwardly moved by opening or closing the articulated link 344*b*. As a result, the lower end of the spring 330 may be selectively inserted into the lower spring hole 314.

Figure 13:
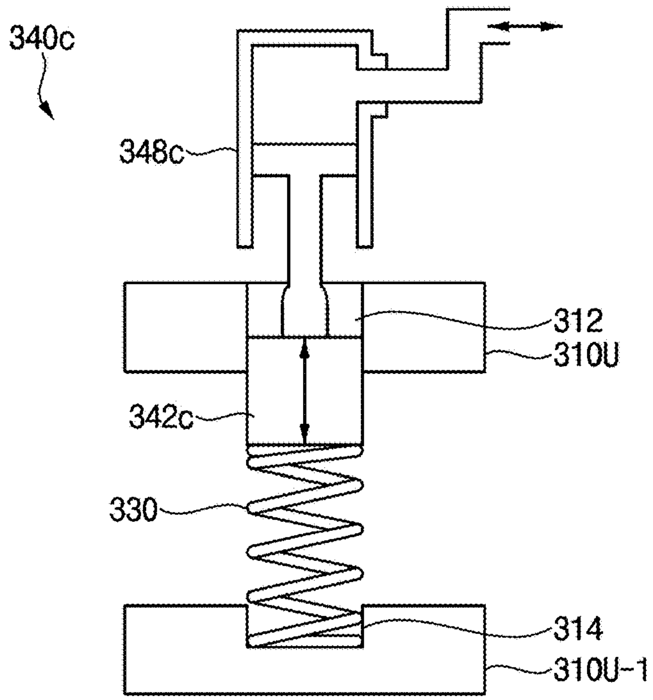
Figure 14:
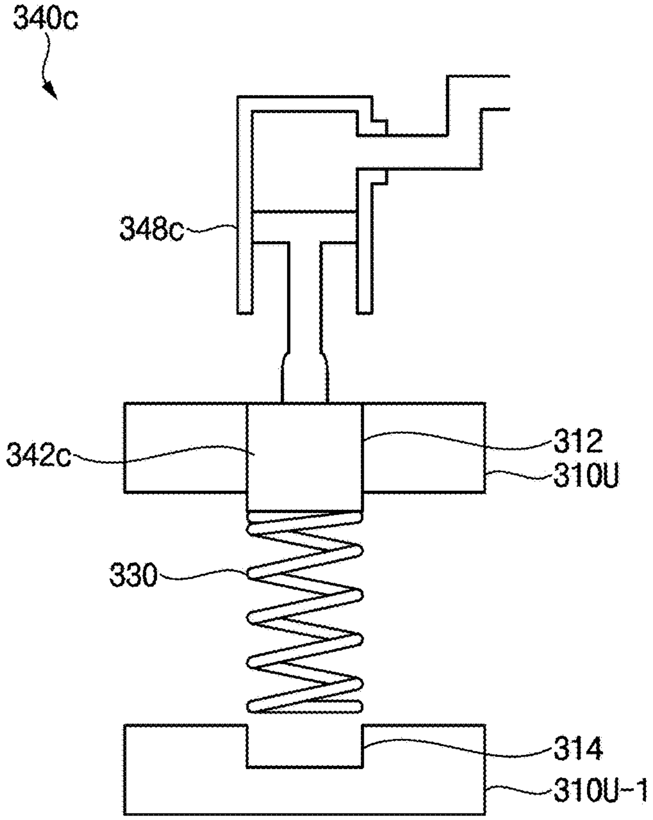

FIGS. 13 and 14 are cross-sectional views illustrating an example pressurizing module of a damping apparatus.

Referring to FIGS. 13 and 14, an example pressuring module 340*c* may include a piston 342*c* and a cylinder 348*c*. The piston 342*c* may be movably received in the upper spring hole 312. The piston 342*c* may be connected to the upper end of the spring 330. The cylinder 348*c* may upwardly or downwardly move the piston 342*c* by supplying a working fluid in different directions. In examples, the cylinder 348*c* may include a hydraulic cylinder or a pneumatic cylinder.

Therefore, the cylinder 348*c* may upwardly or downwardly move the piston 342*c* by the supplying the working fluid in different directions so that the lower end of the spring 330 may be selectively inserted into the lower spring hole 314.

According to examples, the pressurizing modules may selectively connect the springs with the weights to control a total spring constant of the springs. Thus, a natural frequency of the damping apparatus may be controlled to effectively attenuate the vibration of the spindle.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of example implementations and is not to be construed as limiting thereof. Although a few example implementations have been described, those skilled in the art will readily appreciate that many modifications are possible in the example implementations without droplet departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example implementations and is not to be construed as limited to the specific example implementations disclosed, and that modifications to the disclosed example implementations, as well as other example implementations, are intended to be included within the scope of the appended claims.

What is claimed is:

1. A damping apparatus comprising:

a plurality of weights connected to a spindle comprising at least adjacent lower weights and adjacent upper weights;

a plurality of dampers arranged between adjacent lower weights among the plurality of weights and configured to attenuate a vibration of the spindle;

a plurality of springs arranged between adjacent upper weights among the plurality of the weights; and a plurality of pressurizing modules configured to selectively connect each spring of the plurality of springs with the adjacent upper weights.

2. The damping apparatus of claim 1, wherein the plurality of the weights are vertically stacked on an upper surface of the spindle.

3. The damping apparatus of claim 2, wherein the adjacent upper weights comprise a plurality of spring holes configured to receive ends of springs.

4. The damping apparatus of claim 3, wherein each weight of the plurality of weights has a horseshoe shape.

5. The damping apparatus of claim 1, wherein each damper of the plurality of the dampers is connected between a lowermost weight connected to the spindle and a lower weight just over the lowermost weight among the plurality of weights.

6. The damping apparatus of claim 1, wherein each spring of the plurality of the springs is connected between an uppermost weight among the plurality of weights and an upper weight just under the uppermost weight.

7. The damping apparatus of claim 6, wherein each spring of the plurality of springs comprises:

an outer spring; and an inner spring arranged inside a coil of the outer spring.

8. The damping apparatus of claim 1, wherein each pressuring module of the plurality of pressuring modules comprises:

a piston connected to an upper end of a spring of the plurality of springs;

a connecting rod rotatably connected to the piston; and a crankshaft to which an upper end of the connecting rod is rotatably connected and which is configured to rotate the connecting rod.

9. The damping apparatus of claim 1, wherein each pressuring module of the plurality of pressuring modules comprises:

a piston connected to an upper end of a spring of the plurality of springs;

a rack connected to the piston; and a pinion engaged with the rack and configured to vertically move the rack.

10. The damping apparatus of claim 1, wherein each pressuring module of the plurality of pressuring modules comprises:

A piston connected to an upper end of a spring of the plurality of springs; and an articulated link configured to vertically move the piston.

11. The damping apparatus of claim 1, wherein each pressuring module of the plurality of pressuring modules comprises:

a piston connected to an upper end of a spring of the plurality of springs; and a cylinder configured to vertically move the piston.

12. A damping apparatus comprising:

a plurality of weights vertically stacked on an upper surface of a spindle;

a plurality of dampers connected between a lowermost weight among the plurality of weights and a lower weight just over the lowermost weight;

a plurality of springs arranged between an uppermost weight among the plurality of weights and an upper weight just under the uppermost weight; and a plurality of pressurizing modules configured to selectively connect lower ends of the springs with the upper weight.

13. The damping apparatus of claim 12, wherein the uppermost weight comprises a plurality of upper spring holes configured to receive upper ends of the plurality of springs, and the upper weight comprises a plurality of lower spring holes configured to receive lower ends of the plurality of springs.

14. The damping apparatus of claim 12, wherein each spring of the plurality of springs comprises:

an outer spring; and an inner spring arranged inside a coil of the outer spring.

15. The damping apparatus of claim 12, wherein each pressuring module of the plurality of pressuring modules comprises:

a piston connected to an upper end of a spring of the plurality of springs;

a connecting rod rotatably connected to the piston; and a crankshaft to which an upper end of the connecting rod is rotatably connected and which is configured to rotate the connecting rod.

16. The damping apparatus of claim 12, wherein each pressuring module of the plurality of pressuring modules comprises:

a piston connected to an upper end of a spring of the plurality of springs;

a rack connected to the piston; and a pinion engaged with the rack and configured to vertically move the rack.

17. The damping apparatus of claim 12, wherein each pressuring module of the plurality of pressuring modules comprises:

a piston connected to an upper end of a spring of the plurality of springs; and an articulated link configured to vertically move the piston.

18. The damping apparatus of claim 12, wherein each pressuring module of the plurality of pressuring modules comprises:

a piston connected to an upper end of a spring of the plurality of springs; and a cylinder configured to vertically move the piston.

19. A grinder comprising:

a grinding wheel configured to grind a backside of a wafer;

a spindle configured to provide the grinding wheel with a rotary force; and a damping apparatus configured to attenuate a vibration of the spindle, wherein the damping apparatus comprises:

a plurality of weights connected to the spindle;

a plurality of dampers arranged between adjacent lower weights among the plurality of the weights and configured to attenuate a vibration of the spindle;

a plurality of springs arranged between adjacent upper weights among the plurality of the weights; and a plurality of pressurizing modules configured to selectively connect the plurality of springs with any one of the adjacent upper weights.

20. The grinder of claim 19, wherein the dampers are connected between a lowermost weight among the plurality of the weights and a lower weight just over the lowermost weight, and the springs are connected between an uppermost weight among the plurality of the weights and an upper weight just under the uppermost weight.

* * * * *